(12) United States Patent
Chalmandrier-Perna (10) Patent No.: US 10,999,310 B2
(45) Date of Patent: May 4, 2021

(54) ENDPOINT SECURITY CLIENT EMBEDDED IN STORAGE DRIVE FIRMWARE

(71) Applicant: Seagate Technology LLC, Cupertino, CA (US)

(72) Inventor: Michael Francis Chalmandrier-Perna, San Jose, CA (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 266 days.

(21) Appl. No.: 16/200,905

(22) Filed: Nov. 27, 2018

(65) Prior Publication Data

US 2020/0169581 A1 May 28, 2020

(51) Int. Cl.
*H04L 29/06* (2006.01)
(52) U.S. Cl.
CPC ...... *H04L 63/1433* (2013.01); *H04L 63/1425* (2013.01); *H04L 63/20* (2013.01)
(58) Field of Classification Search
CPC ............. H04L 63/1433; H04L 63/1441; H04L 63/1408; H04L 63/20; H04L 63/1425
USPC .......................................................... 726/25
See application file for complete search history.

(56) References Cited

U.S. PATENT DOCUMENTS

| 9,225,527 | B1 | 12/2015 | Chang |
| 9,596,602 | B2 * | 3/2017 | Rider .................... H04W 12/08 |
| 9,813,911 | B2 * | 11/2017 | Kong ..................... H04W 4/42 |
| 9,830,099 | B1 | 11/2017 | Johansson et al. |
| 2013/0167228 | A1 | 6/2013 | Wong |

* cited by examiner

*Primary Examiner* — Longbit Chai
(74) *Attorney, Agent, or Firm* — Holzer Patel Drennan (57) ABSTRACT

To combat data theft and/or sabotage, a network-level security client may monitor and selectively apply security protocols to manage risk in data transfers within, incoming to, and outgoing from an organization's data network. This top-down approach may become increasingly difficult to maintain within a data network with numerous connected terminals, storage devices, and other devices, many of which may be attempting data transfers simultaneously. In the presently disclosed technology, connected data storage devices each include an endpoint security client embedded in data storage device firmware. The endpoint security clients each establish a security client connection with a network security client upon connection to a data storage network, monitor data transfers within the data storage network, and selectively apply security protocols to manage risk in data transfers, thereby decentralizing some aspects of data security within the organization's data network.

20 Claims, 4 Drawing Sheets

ENDPOINT SECURITY CLIENT EMBEDDED IN STORAGE DRIVE FIRMWARE

BACKGROUND

Data security refers generally to the protection of digital data, such as that stored within one or more databases within an organization's data network. Unauthorized or authorized users may attempt unwanted actions on the organization's data network by performing cyberattacks and data theft. With the advent of economical portable storage drives with relatively large data storage capacity, relatively small physical size, and relatively fast data transfer rates (e.g., flash drives), transferring data onto a portable storage drive while connected to the organization's data network, and then physically taking the portable storage drive off-site is increasingly easy to accomplish and conceal.

SUMMARY

Implementations described and claimed herein address the foregoing problems by providing a data storage device comprising an endpoint security client embedded in data storage device firmware. The endpoint security client establishes a security client connection with a network security client upon connection to a data storage network, monitors data transfers within the data storage network involving the data storage device, assigns a risk score to each data transfer, and applies a security protocol to each data transfer corresponding to its assigned risk score.

Implementations described and claimed herein address the foregoing problems by further providing a method of operating an endpoint security client embedded in firmware of a data storage device. The method comprises establishing a security client connection with a network security client upon connection to a data storage network, monitoring data transfers within the data storage network involving the data storage device, assigning a risk score to each data transfer, and applying a security protocol to each data transfer corresponding to its assigned risk score.

Implementations described and claimed herein address the foregoing problems by still further providing one or more computer-readable storage media encoding computer-executable instructions for executing on a computer system an endpoint security client embedded in firmware of a data storage device. The computer process comprises establishing a security client connection with a network security client upon connection to a data storage network, monitoring data transfers within the data storage network involving the data storage device, assigning a risk score to each data transfer, and applying a security protocol to each data transfer corresponding to its assigned risk score.

Other implementations are also described and recited herein.

DETAILED DESCRIPTIONS

To combat data theft and/or sabotage, a network-level security client may monitor and selectively apply security protocols to manage risk in data transfers within, incoming to, and outgoing from an organization's data network. This top-down approach may become increasingly difficult to maintain within a data network with numerous connected terminals, storage devices, and other devices, many of which may be attempting data transfers simultaneously. Further, any applied security protocol must be completed by the network-level security client prior to a portable data storage device being removed from the data network. As such, the network-level security client may create a data-transfer bottleneck within the data network.

Some or all storage drives within the organization's data network may be equipped with hard-disc based full disk encryption (FDE). These storage drives may also be referred to as self-encrypting drives (SEDs). Generally, data on an SED is maintained in a fully encrypted state. Data written to the SED is automatically encrypted and data read from the SED is automatically decrypted for the user, so long as encryption keys managed by the drive controller are valid for the user. While installed within the organization's network, a network security client may further manage the encryption keys on the individual SEDs and thus different users' access to data within the data network. Unauthorized users are prevented access to the encryption keys, and thus are not able to access the encrypted data on the SED. While SEDs can provide adequate protection against data transfers by unauthorized users, SEDs may not provide adequate protection against data transfers by authorized users, whose authorization is later revoked after a storage device is removed from the organization's data network, for example.

Figure 1:
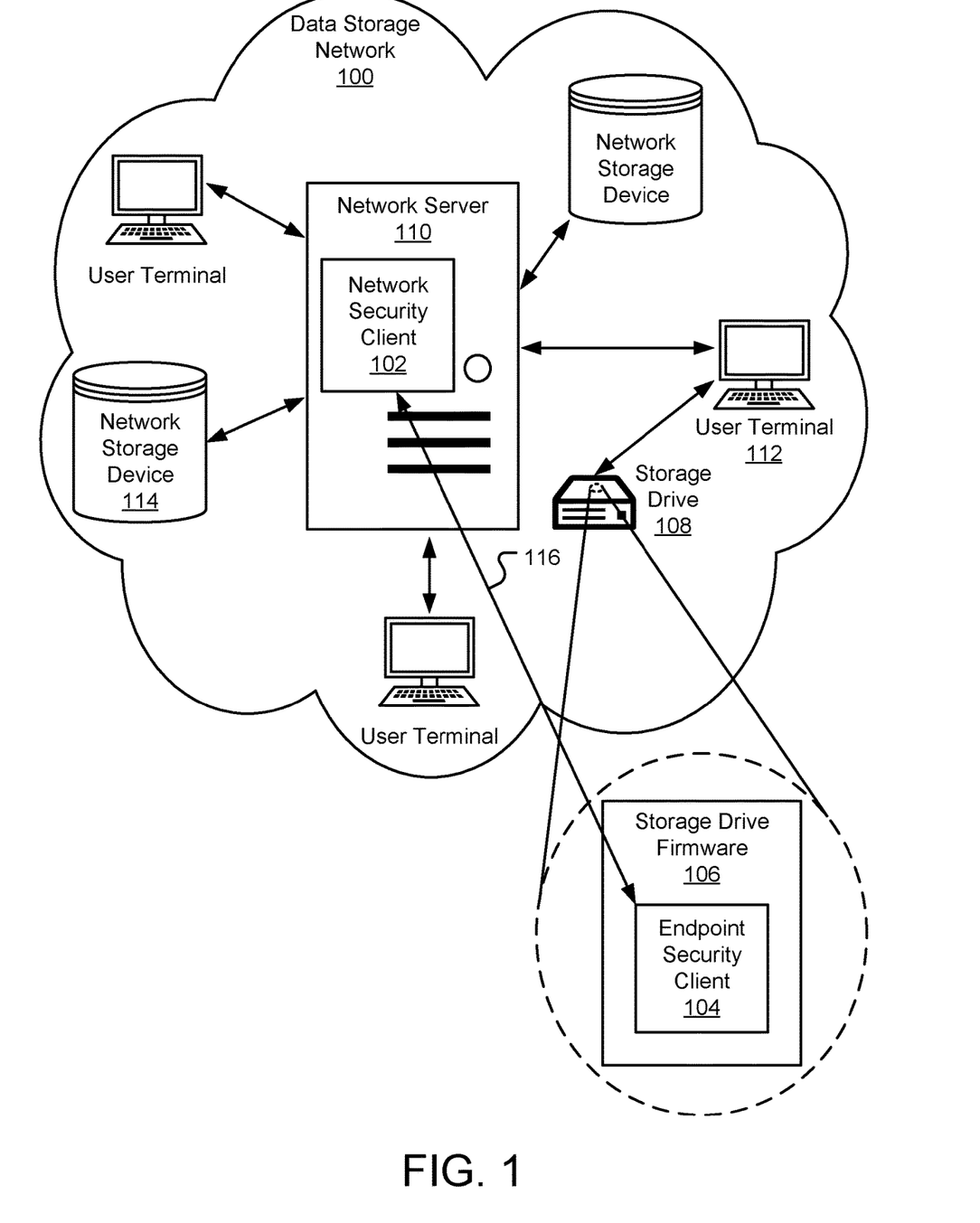
FIG. 1 illustrates an example data storage network system diagram including a network security client and an endpoint security client embedded in firmware on a connected storage drive.

FIG. 1 illustrates an example data storage network 100 system diagram including a network security client 102 and an endpoint security client 104 embedded in firmware 106 on a connected storage drive 108 (collectively, a security system). The data storage network 100 may be a local area network (LAN) or a wide area network (WAN), or a combination thereof that is managed by a network server 110. The network server 110 manages access to the network 100, while may come from any of an array of connected user terminals (e.g., user terminal 112). In various implementations, the number of connected user terminals may vary from one to many, and user terminals may be connected to and disconnected from the storage network 100 over time. The network server 110 may also manage access to network storage devices (e.g., network storage device 114). The network storage devices are utilized as central data storage space for the data storage network 100. In various implementations, the number of network storage devices may vary from one to many, and network storage devices may be connected to and disconnected from the storage network 100 over time. In some implementations, the network server 110 may also permit data access between user terminals within the network 100. In general, the network server 110 manages access to the network storage devices via the connected user terminals over the data storage network 100.

The network security client 102 generally manages security of data transfers within the data storage network 100, including but not limited to ensuring that connected portable data storage drives each include an endpoint security client with a security protocol table (not shown, see e.g., security protocol table 226 of FIG. 2) applicable to the data storage network 100. While not normally visible, the network security client 102 is illustrated conceptually as software running on the network server 110 in FIG. 1. In some implementations, user terminal security clients (not shown) are included on each user terminal that possess some of the functionality of the network security client 102 and/or the endpoint security clients (e.g., endpoint security client 104).

Some or all of the user terminals may have a capability to connect portable data storage drives (e.g., storage drive 108, illustrated as connected to user terminal 112). A user of the user terminal 112 may selectively transfer data from any of the network server 110, the network storage devices, and/or the user terminals within the network 100 unto the storage drive 108 via the user terminal 112 used as a conduit. As the storage drive 108 is physically connected within the data storage network 100, such a transfer may be permitted, particularly if the user is an authorized user and logged in a such on the user terminal 112. In some implementations, the storage drive 108 may be a component of a portable computing device (not shown), which may be removed from the data storage network 100 in its entirety rather than the storage drive 108 alone.

The storage drive 108 includes firmware 106, much of which is directed to basic functionality of the storage drive (e.g., basic boot instructions, spindle motor operation, and so on). While not normally visible, the firmware 106 is illustrated conceptually within the storage drive 108 in FIG. 1. In the instance of a self-encrypting drive (SED), the firmware 106 also contains encryption keys used to automatically encrypt incoming data and decrypt outgoing data from the storage drive 108 so long as the user has access to the encryption keys. While full disk encryption (FDE) on the storage drive 108 may prevent unauthorized users from gaining access to the data content of the storage drive 108, an authorized user with access to the encryption keys maintains access, even if access is withdrawn by the network security client 102 after the storage drive 108 has been removed from the network 100.

In some implementations, FDE may be performed at the network 100 level on all connected storage devices and managed by the network server 110. However, if the encryption keys are stored at network server 110, any portable storage drives are non-functional when removed from the network 100 as the encryption keys do not travel with the portable storage drives. The presently disclosed technology distinguishes between data transfers to the storage drive 108 and selectively performs additional security measures (or data protection measures) on the data transferred to the storage drive 108, which remain effective even after the storage drive 108 is removed from the network 100.

Generally, the endpoint security client 104 is tasked with monitoring data transfers within the network 100 that involve the storage drive 108 and rates transfers on a risk scale. When a data transfer is requested or occurs from the network 100 to a connected storage drive, or vice versa, the endpoint security client 104 detects the data transfer and ranks its risk on the risk scale. Depending on the risk scale rating, the endpoint security client 104 may apply additional security measures on the data transfer. In various implementations, the additional security measures are determined prior to commencing the data transfer and executed concurrently as the data transfer occurs. Regardless, the additional security measures are completed prior to or concurrently with completion of the data transfer. Additional detail on the data exchange between the network security client 102 and the endpoint security client 104 (illustrated by arrow 116), as well as other operation of the endpoint security client 104 is described in further detail below with reference to FIG. 2.

In various implementations, the endpoint security client 104 comes pre-installed within firmware on commercially available storage drives but remains dormant until and unless the storage drive 108 is connected to the storage network 100 with the network security client 102 (or another storage network with an active network security client). In other implementations, upon connection to the storage network 100, the network security client 102 automatically installs the endpoint security client 104 within the firmware 106 on the storage drive 108 (and other portable storage drives as they are connected to the storage network 100), in some cases without input or authorization from the user.

Figure 2:
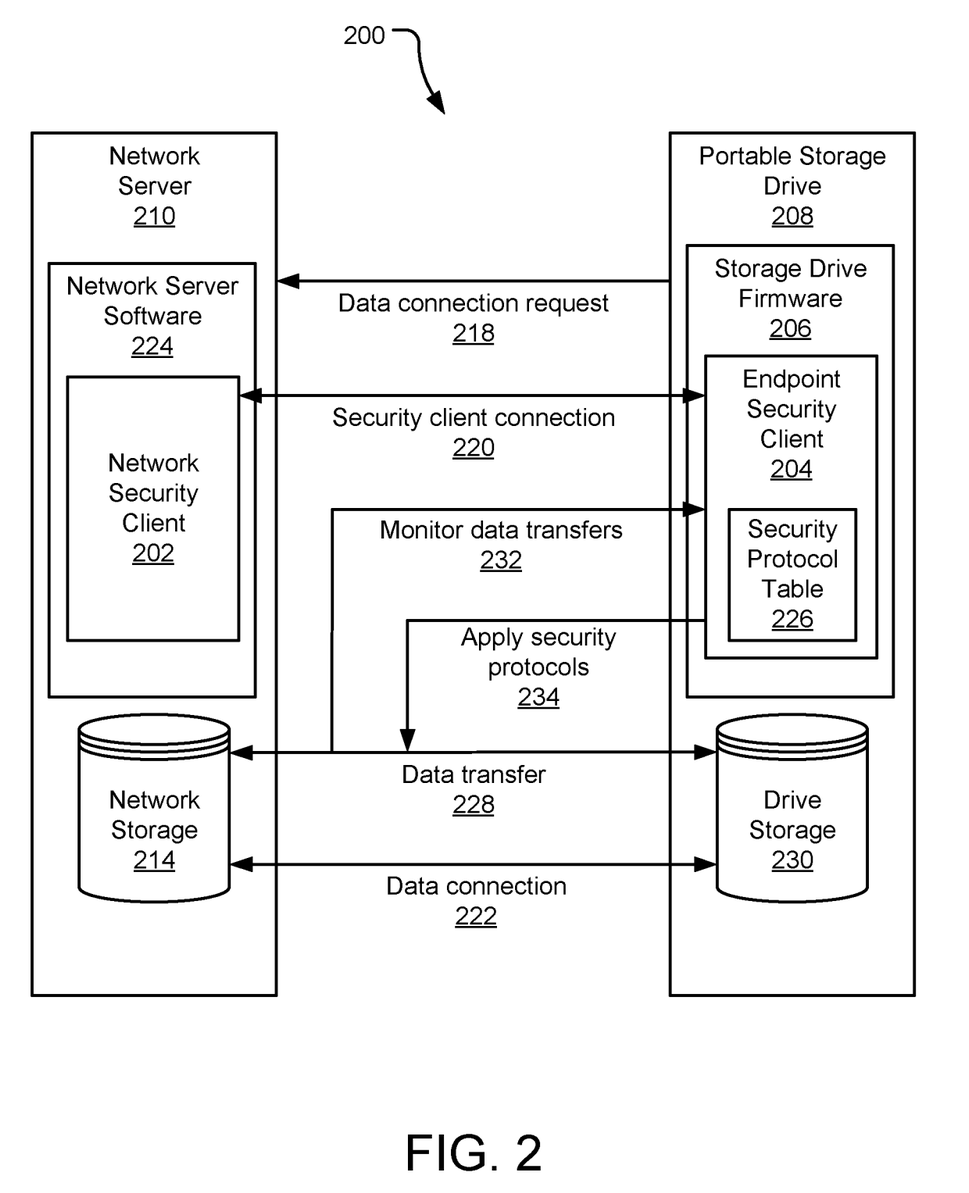
FIG. 2 illustrates an example data exchange between a network security client on a network server and an endpoint security client on a portable storage drive.

FIG. 2 illustrates an example data exchange 200 between a network security client 202 on a network server 210 and an endpoint security client 204 on a portable storage drive 208. Upon physical connection to a corresponding data storage network (not shown, see e.g., data storage network 100 of FIG. 1), the portable storage drive 208 requests data access to the data storage network.

The network security client 202 executes within network server software 224 on the network server 210. Upon detection of the presence of the portable storage drive 208 and/or receipt of the data connection request 218, the network security client 202 establishes a security client connection 220 with the endpoint security client 204. The endpoint security client 204 executes within storage drive firmware 206 on the portable storage drive 208. Establishing the security client connection 220 may include verifying the presence of the endpoint security client 204 on the portable storage drive 208 and establishing a secure communication link (or secured channel) between the network security client 202 and the endpoint security client 204.

The storage drive firmware 206 may be embedded within a secured portion of drive storage 230 with limited communication and read/write access as compared to the remainder of the drive storage 230. The storage drive firmware 206 may also be embedded on a separate storage medium within the portable storage drive 208 meant specifically for the storage drive firmware 206 and having limited communication and read/write access (e.g., on an application-specific integrated circuit (ASIC)).

Establishing the security client connection 220 may also include locking control of the storage drive firmware 206 to changes by other software (or selectively granting access to only specific pre-approved or "white-listed" software programs). In this implementation, unauthorized (or unapproved) software that would seek to remove or reduce the functionality of the endpoint security client 204 (e.g., malware) is denied access by the storage drive firmware 206. The storage drive firmware 206 may then only be modified, and in some implementations only in a limited sense, by the network security client 202. Further, any changes that do occur to the storage drive's firmware 206 may be recorded in a registry on the storage drive 208, on the data storage network, or elsewhere so that the changes to the firmware 206 may be tracked and attributed to a source, if needed. For example, the date, location, endpoint operating system, and IP address where the storage drive 208 is first placed into service is recorded and changes to the same are tracked and recorded over time.

In implementations where the endpoint security client 204 is not preexisting within the storage drive firmware 206, establishing the security client connection 220 includes embedding the endpoint security client 204 within the storage drive firmware 206 prior to establishing the security client connection 220. In implementations where the endpoint security client 204 is preexisting within the storage drive firmware 206, establishing the security client connection 220 may include updating the endpoint security client 204, including but not limited to updating a security protocol table 226 stored on the storage drive firmware 206 that correlates each of a series of potential risk scores to a security protocol to be selectively applied by the endpoint security client 204. In some implementations, the endpoint security client 204 may be modified in real time as the requirements imposed by the network security client 202 change. More specifically, establishing the security client connection 220 may include selectively turning on and/or off a selection of available features provided by the endpoint security client 204, or storing a new feature within the storage drive firmware 206 to be executed by the endpoint security client 204.

Concurrently, or subsequent to establishing the security client connection 220, the network server 210 receives the data connection request 218 and establishes a data connection 222 between the portable storage drive 208 and network storage 214. The data connection 222 may be read access, write access, or read/write access to the network storage 214, depending on the network configuration settings. In various implementations, the security client and data connections 220, 222 may be initiated concurrently or sequentially, but the security client connection 220 is completed prior to authorizing the transfer of any data.

Subsequent to successful data and security client connections 220, 222 between the network server 210 and the portable storage drive 208, the portable storage drive 208 may request a data transfer 228 from drive storage 230 to the network storage 214, from the network storage 214 to the drive storage 230, or a combination thereof. Concurrently, the endpoint security client 204 monitors incoming and outgoing data transfers 232 (e.g., the endpoint security client 204 performs deep-packet inspection on the data transfers 232) and assigns a risk score to each data transfer. The assigned risk scores are correlated to security protocols on the security protocol table 226, and the corresponding security protocol is applied by the endpoint security client 204 to each data transfer 228, as illustrated by arrow 234. This process may be repeated, sequentially and/or simultaneously for each data transfer 228 as it is requested, but prior to completion of each data transfer 228. In some implementations, the endpoint security client 204 is only responsible for monitoring and assigning risk scores to incoming data transfers. Outgoing data transfers are monitored and managed by the network security client 202.

The risk scores may be as simple as a two-score implementation (e.g., low-risk and high-risk) or a more complex implementation on a numerical scale (e.g., 1-10, ranging from lowest-risk to highest-risk). Various options for security measures include, but are not limited to disallowing, encrypting, corrupting, and/or deleting incoming and/or outgoing data transfers. Another example security measure may include notifying the network security client 202 of data transfers above a risk threshold. Yet another security measure is application of a time-sensitive security measure (e.g., encrypting or corrupting data on the storage drive 208 if not reconnected to an authorized data storage network within a predetermined period of time (e.g., 24 hours, 30 days, and so on).

Data-specific factors that define the risk scores may include suspicious file types (e.g., video or picture files), file quantity (e.g., a number of files above a predetermined threshold), file source (e.g., relative sensitivity of data on particular areas of the network storage 214), and data quantity (e.g., a total transfer size above a predetermined threshold). Other factors that define the risk scores may include timestamp (e.g., transfers occurring outside normal business hours), employee role (e.g., research-and-development employees are considered higher-risk than sales and marketing employees), user terminal location (e.g., user terminals physically located in restricted areas are considered higher-risk than user terminals in common areas). File transfer requests that receive high-risk scores may be referred to herein as edge cases. In some implementations, the security clients 202, 204 may utilize artificial intelligence or machine-learning to modify the weighting of various risk factors, as well as add more relevant risk factors and remove less relevant risk factors over time to improve accuracy of the risk scores.

In an example scenario, the security protocol table 226 includes low, medium, and high-risk scores. Data transfers that qualify as low-risk are permitted to be completed without applying additional security measures. Data transfers that qualify as medium-risk are permitted to be completed, but with some additional security measures (e.g., encryption of incoming files). Data transfers that qualify as high-risk may not be permitted to be completed (e.g., incoming files are corrupted as they are transferred, or not permitted to be transferred at all).

In some implementations, the additional security measures applied to a data transfer are not visible to the user (without the user's input or knowledge). This may prevent alerting the user and encouraging the user to attempt to circumvent the security measures while still connected to the data storage network. Further, the data transfer may appear successful to the user in order to misdirect the user. Still further, the additional security measures may include a tracking option that reveals the storage drive's physical location to authorities if reconnected to an offsite network with access to the Internet or world-wide-web.

In implementations that include encryption as a matter of course (e.g., on SEDs) or encryption as an additional security measure, encryption keys that might typically be stored on the storage drive 208 along with the data itself may be instead communicated over the security client connection 220 for storage on the network server 210. So long as the storage drive 208 is connected to and granted data access to the data storage network (even as it is moved between different user terminals), the encrypted files are decrypted using the keys stored at the network server 210. However, once the storage drive 208 is removed from the data storage network, the keys are not only no longer accessible by the user, but not even stored on the storage drive 208 itself. Thus, the encrypted files on the storage drive 208 are unrecoverable unless the storage drive 208 is reconnected to the data storage network.

In another example scenario, data transfers that meet a risk-score threshold are marked for later corruption at the portable storage drive 208 if connected to an unapproved data storage network. More specifically, there may be one or more approved data storage networks that the portable storage drive 208 may be connected to in order to facilitate a user's authorized work using data on the portable storage drive 208. However, if the user connects the portable storage drive 208 to an unapproved data storage network, the portable storage drive 208 actively corrupts (or encrypts, with a corresponding key inaccessible to the user) the data stored on the portable storage drive 208 to prevent a subsequent transfer to the unapproved data storage network.

Figure 3:
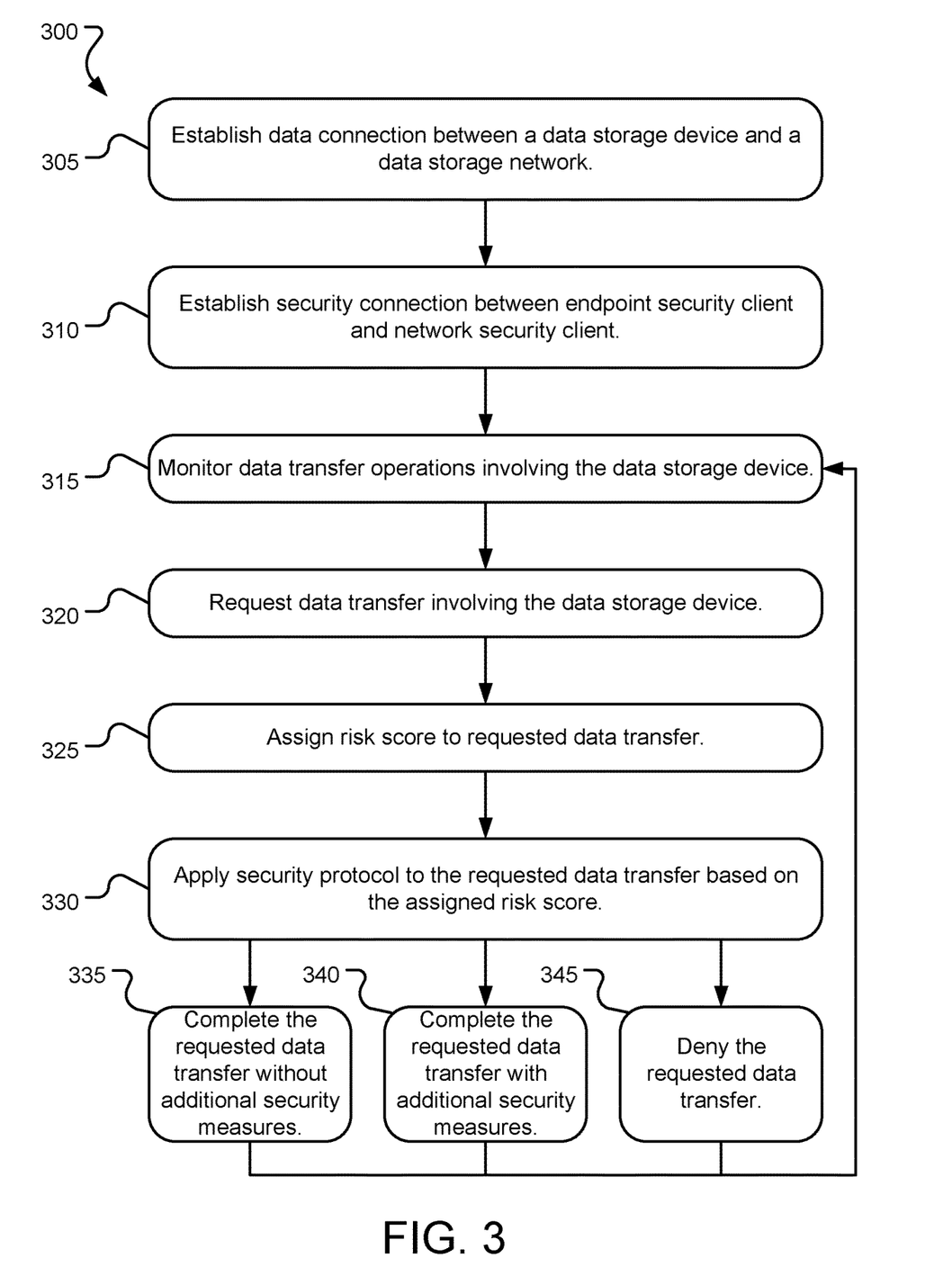
FIG. 3 illustrates example operations for operating an endpoint security client embedded in firmware of a data storage device.

FIG. 3 illustrates example operations 300 for operating an endpoint security client embedded in firmware of a data storage device. A first establishing operation 305 establishes a data connection between the data storage device and a data storage network. In various implementations, the establishing operation 305 includes physically connecting the data storage device to the data storage network via a user terminal, sending a data connection request from the data storage device to the data storage network via the user terminal, and a network server granting the data connection request on behalf of the data storage network.

A second establishing operation 310 establishes a security connection between the endpoint security client and a network security client running on network server software. In implementations where the endpoint security client is not preexisting within the storage drive firmware, the second establishing operation 310 includes embedding the endpoint security client within the storage drive firmware prior to establishing the security client connection. In implementations where the endpoint security client is preexisting within the storage drive firmware, the second establishing operation 310 may include updating the endpoint security client, including but not limited to updating a security protocol table stored on the storage drive firmware that correlates each of a series of potential risk scores to a security protocol to be selectively applied by the endpoint security client. In various implementations, the establishing operations 305, 310 may be performed sequentially or simultaneously. However, the establishing operation 310 should be complete prior to acting on the following requesting operation 320.

A monitoring operation 315 monitors data transfer operations involving the data storage device, including but not limited to the data transfer of requesting operation 320 (below). The monitoring operation 315 monitors the data transfer operations for factors that define security breach risk associated with each requested data transfer (e.g., suspicious file types, file quantity, file source, data quantity, and timestamp). The requesting operation 320 requests a data transfer from the data storage device to network storage within the data storage network, from the network storage to the data storage device, or some combination thereof. The requesting operation 320 may be achieved by a user of the user terminal attempting to move or copy files from the data storage device to the network, from the network storage to the data storage device, or some combination thereof via software running on the user terminal and/or the network server.

An assigning operation 325 assigns a risk score to the data transfer of the requesting operation 320 (and other requested data transfers as they occur) based on the detected security breach risk factors. The data storage device firmware consults a security protocol table, which associates each of two or more risk score options with an appropriate security protocol. An applying operation 330 applies the appropriate security protocol per the security protocol table to the data transfer of the requesting operation 320 based on the detected security breech risk factors. In various implementations, the security protocol may include one or more security measures including, but not limited to disallowing, encrypting, corrupting, and/or deleting incoming and/or outgoing data transfers.

Depending on the applied security protocol, the requested data transfer is either completed without additional security measures 335, completed with additional security measures (e.g., additional encryption) 340, or denied (with or without notifying the user) 345. Meanwhile, the monitoring operation 315 continues to monitor data transfer operations involving the data storage device and operations 320-345 repeat for each requested data transfer so long as the data storage device is connected to the data storage network.

Figure 4:
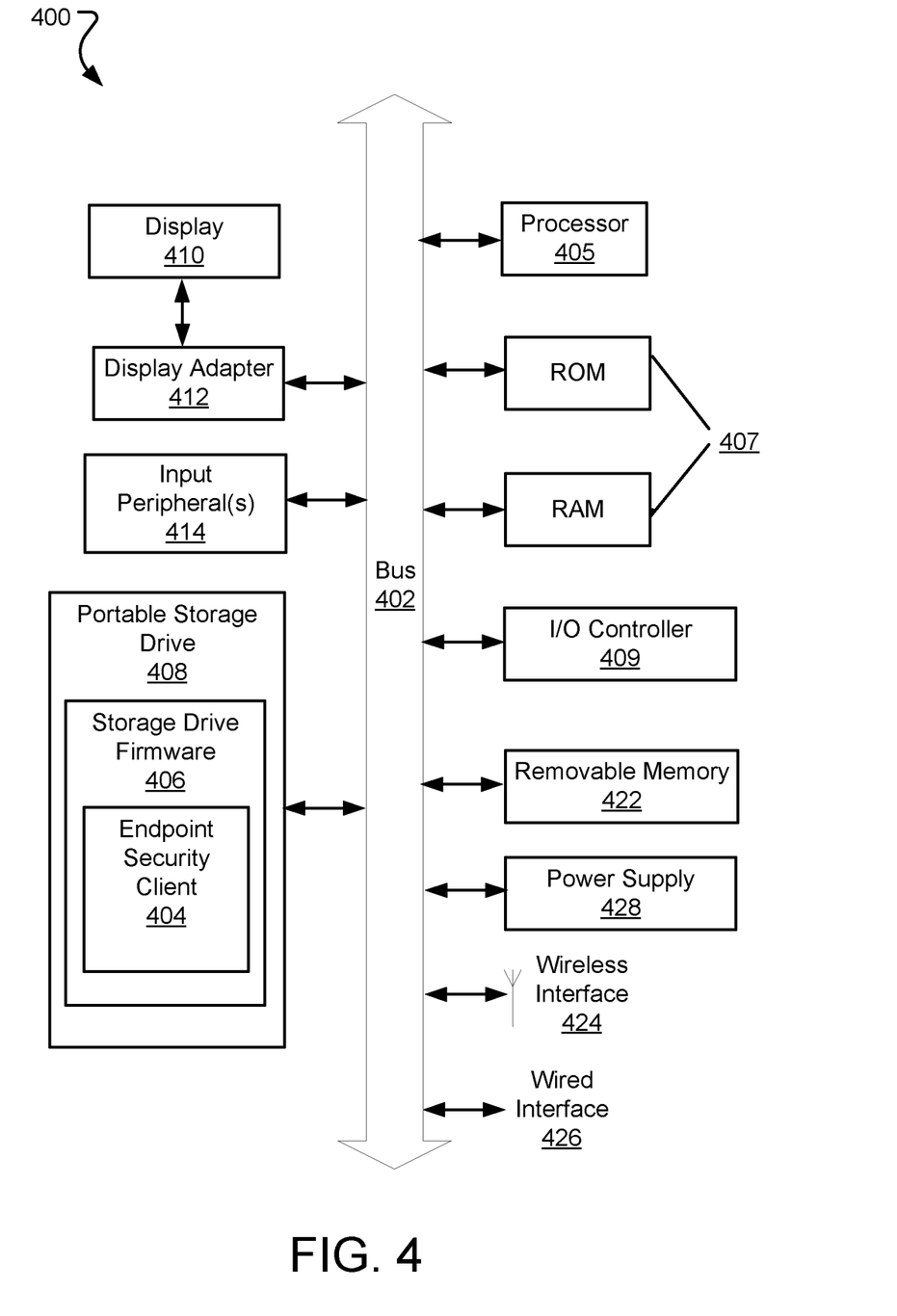
FIG. 4 illustrates an example system diagram of a computer system suitable for implementing aspects of an endpoint security client embedded in firmware on a connected storage drive.

FIG. 4 illustrates an example system diagram of a computer system 400 suitable for implementing aspects of an endpoint security client 404 embedded in firmware 406 on a connected portable storage drive 408. For example, the portable storage drive 408 is connected to a data storage network via the computer system 400, which is being used as a user terminal within the data storage network. The system 400 includes a bus 402 which interconnects major subsystems such as a processor 405, internal memory 407 (such as random-access memory (RAM) and read-only memory (ROM)), an input/output (I/O) controller 409, removable memory (such as a memory card) 422, a power supply 428, and external devices such as a display screen 410 via a display adapter 412, and various input peripherals 414 (e.g., a mouse, trackpad, keyboard, touchscreen, joystick, and/or smart card acceptance device). Wireless interface 424 together with a wired network interface 426, may be used to interface to the data storage network and/or a local or wide area network (such as the Internet) using any network interface system known to those skilled in the art.

Many other devices or subsystems (not shown) may be connected in a similar manner (e.g., servers, personal computers, tablet computers, smart phones, mobile devices, etc.). Also, it is not necessary for all of the components depicted in FIG. 4 to be present to practice the presently disclosed technology. Furthermore, devices and components thereof may be interconnected in different ways from that shown in FIG. 4. Code (e.g., computer software, including mobile applications (apps) to implement the presently disclosed technology may be operably disposed in the internal memory 407, stored on removable storage media such as the removable memory 422 or the portable storage drive 408, a floppy disk, a thumb drive, and/or an optical medium. For example, in an implementation of the computer system 400, code for implementing the endpoint security client 404 described in detail above may be stored in the firmware 406, as shown.

The computing system 400 may include a variety of tangible computer-readable storage media (e.g., the internal memory 407, the removable memory 422, and the portable storage drive 408) and intangible computer-readable communication signals. Tangible computer-readable storage can be embodied by any available media that can be accessed by the computing system 400 and includes both volatile and non-volatile storage media, as well as removable and non-removable storage media implemented in any method or technology for storage of information such as computer readable instructions, data structures, program modules, and/or other data. Tangible computer-readable storage media includes, but is not limited to, firmware, RAM, ROM, electrically erasable programmable read-only memory (EEPROM), flash memory or other memory technology, optical disc storage, magnetic cassettes, magnetic tape, magnetic disc storage or other magnetic storage devices, or any other tangible medium which can be used to store the desired information and which can be accessed by the computing system 400.

Intangible computer-readable communication signals may embody computer readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, radio-frequency (RF), infrared (IR), and other wireless media. Computer-readable storage media as defined herein specifically excludes intangible computer-readable communications signals.

Some implementations may comprise an article of manufacture which may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (APIs), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

The presently disclosed technology may be implemented as logical steps in one or more computer systems (e.g., as a sequence of processor-implemented steps executing in one or more computer systems and as interconnected machine or circuit modules within one or more computer systems). The implementation is a matter of choice, dependent on the performance requirements of the computer system implementing the presently disclosed technology. Accordingly, the logical operations making up implementations of the presently disclosed technology are referred to variously as operations, steps, objects, or modules. Furthermore, it should be understood that logical operations may be performed in any order, adding or replacing operations as desired, unless explicitly claimed otherwise or a specific order is inherently necessitated by the claim language.

The above specification, examples, and data provide a complete description of the structure and use of exemplary implementations of the presently disclosed technology. Since many implementations of the presently disclosed technology can be made without departing from the spirit and scope of the invention, the presently disclosed technology resides in the claims hereinafter appended. Furthermore, structural features of the different implementations may be combined in yet another implementation without departing from the recited claims.

What is claimed is:

1. A data storage device comprising:
an endpoint security client embedded in data storage device firmware of the data storage device to:
establish a security client connection with a network security client of a network server upon connection to a data storage network, wherein the endpoint security client of the data storage device is connected to the network security client of the network server over the data storage network through the security client connection;
establish a data connection, over the data storage network, between the data storage device and a network storage device of the data storage network concurrently with or subsequent to establishing the security client connection, wherein the data connection is distinct from the security client connection;
monitor data transfers between the network storage device and the data storage device;
assign a risk score to each data transfer; and
apply a security protocol to each data transfer corresponding to its assigned risk score.

2. The data storage device of claim 1, wherein the data storage device firmware includes a security protocol table that correlates each of a series of potential risk scores to a security protocol to be applied by the endpoint security client.

3. The data storage device of claim 2, wherein the security protocol table is updated by the network security client on establishment of the security client connection.

4. The data storage device of claim 1, the endpoint security client further to:
receive a security protocol table that correlates each of a series of potential risk scores to a security protocol that may be applied by the endpoint security client from the network security client.

5. The data storage device of claim 1, wherein the endpoint security client exclusively monitors incoming data transfers from the data storage network to the data storage device.

6. The data storage device of claim 1, wherein the risk score is assigned based on at least one of a suspicious file type, file quantity, file source, data quantity, and timestamp of each data transfer.

7. The data storage device of claim 1, wherein the security protocol includes at least one of disallowing, encrypting, corrupting, and/or deleting data transfers that meet a risk-score threshold.

8. The data storage device of claim 1, wherein the security protocol is applied without one or both of a user's input and knowledge.

9. A security system for a data storage network comprising:
the data storage device of claim 1; and
the network server including the network security client, the network security client to direct security measures on data transfers within the data storage network.

10. The security system of claim 9, further comprising:
a user terminal within the data storage network to serve as a conduit for the data transfers involving the data storage device.

11. The security system of claim 9, wherein the security measures directed by the network security client includes denying access by unapproved software to the data storage device firmware.

12. The security system of claim 9, wherein the network security client is configured to modify the data storage device firmware to apply different security measures over time.

13. The data storage device of claim 1, wherein establishing the security connection includes one of:
  installing the endpoint security client within the data storage device firmware; and
  activating the endpoint security client pre-installed within the data storage device firmware.

14. A method of operating an endpoint security client embedded in firmware of a data storage device, the method comprising:
  establishing a security client connection with a network security client of a network server upon connection to a data storage network, wherein the endpoint security client of the data storage device is connected to the network security client of the network server over the data storage network through the security client connection;
  establishing a data connection, over the data storage network, between the data storage device and a network storage device of the data storage network concurrently with or subsequent to establishing the security client connection, wherein the data connection is distinct from the security client connection;
  monitoring data transfers between the network storage device and the data storage device;
  assigning a risk score to each data transfer; and
  applying a security protocol to each data transfer corresponding to its assigned risk score.

15. The method of claim 14, further comprising:
  receiving a security protocol table that correlates each of a series of potential risk scores to a security protocol to be applied by the endpoint security client from the network security client.

16. The method of claim 14, wherein the security protocol is applied to each data transfer prior to its completion.

17. The method of claim 14, wherein establishing the security connection includes one of:
  installing the endpoint security client within the data storage device firmware; and
  activating the endpoint security client pre-installed within the data storage device firmware.

18. One or more computer-readable storage media encoding computer-executable instructions for executing on a computer system an endpoint security client process embedded in firmware of a data storage device, the endpoint security client process comprising:
  establishing a security client connection with a network security client of a network server upon connection to a data storage network, wherein the endpoint security client of the data storage device is connected to the network security client of the network server over the data storage network through the security client connection;
  establishing a data connection, over the data storage network, between the data storage device and a network storage device of the data storage network concurrently with or subsequent to establishing the security client connection, wherein the data connection is distinct from the security client connection;
  monitoring data transfers between the network storage device and the data storage device;
  assigning a risk score to each data transfer; and
  applying a security protocol to each data transfer corresponding to its assigned risk score.

19. The computer-readable storage media of claim 18, the endpoint security client process further comprising:
  receiving a security protocol table that correlates each of a series of potential risk scores to a security protocol to be applied by the endpoint security client from the network security client.

20. The computer-readable storage media of claim 18, wherein the security protocol is applied to each data transfer prior to its completion.

* * * * *